United States Patent [19]

Anderson et al.

[11] Patent Number: 5,523,156
[45] Date of Patent: Jun. 4, 1996

[54] ORGANIC POLYMERS HAVING A MODIFIED SURFACE AND PROCESS THEREFOR

[75] Inventors: Norman S. Anderson; Albert J. Promislow, both of Charlotte, N.C.

[73] Assignee: Hoechst Celanese Corporation, Somerville, N.J.

[21] Appl. No.: 548,824

[22] Filed: Oct. 26, 1995

Related U.S. Application Data

[62] Division of Ser. No. 316,056, Sep. 30, 1994, Pat. No. 5,483,010, which is a continuation of Ser. No. 100,811, Aug. 2, 1993, abandoned.

[51] Int. Cl.⁶ .............................. B32B 27/34; B32B 27/36
[52] U.S. Cl. .......................... 428/395; 428/364; 428/375; 523/206; 8/115.56; 8/115.6; 8/115.64; 8/115.65; 8/115.69
[58] Field of Search ............................ 428/364, 375, 428/395; 523/206; 8/115.6, 115.56, 115.64, 115.69, 115.65

[56] References Cited

U.S. PATENT DOCUMENTS

| | | | |
|---|---|---|---|
| 2,931,746 | 4/1960 | Robitschek et al. | 525/437 |
| 3,454,672 | 7/1969 | Jackson et al. | 525/437 |
| 3,624,139 | 11/1971 | Davis et al. | 260/486 |
| 3,764,617 | 10/1973 | Heckert et al. | 260/410 |
| 4,048,220 | 9/1977 | Cardenas | 560/237 |
| 4,057,554 | 11/1977 | Redmore et al. | 525/403 |
| 4,089,997 | 5/1978 | Van Paesschen et al. | 430/533 |
| 4,259,222 | 3/1981 | Login et al. | 525/437 |
| 4,560,802 | 12/1985 | Evers et al. | 568/388 |
| 4,803,256 | 2/1989 | Luckenbach | 525/437 |
| 4,987,167 | 1/1991 | Nakane et al. | 525/437 |
| 5,043,215 | 8/1991 | Nakane et al. | 428/378 |
| 5,098,602 | 3/1992 | Hirai et al. | 252/299.65 |

FOREIGN PATENT DOCUMENTS 395435  10/1990  European Pat. Off. .

*Primary Examiner*—Melvyn I Marquis
*Assistant Examiner*—Randy Gulakowski
*Attorney, Agent, or Firm*—Philip P. McCann

[57] ABSTRACT

Organic polymer surfaces are modified by contacting such surfaces with a haloester compound and a cationic compound of having a $pK_a>5$. Preferably the organic polymer is selected from the group consisting of polyesters, aromatic polyamides, and graphitic polymers and the contacting is conducted at an elevated temperature.

9 Claims, No Drawings

5,523,156

ORGANIC POLYMERS HAVING A MODIFIED SURFACE AND PROCESS THEREFOR

This is a division of application Ser. No. 08/316,056 filed Sep. 30, 1994, now U.S. Pat. No. 5,483,010 which is a continuation of application Ser. No. 08/100,811 filed Aug. 2, 1993, now abandoned.

FIELD AND BACKGROUND OF INVENTION

The present invention relates to the modification of organic polymer surfaces and the articles produced therefrom. Particularly, the invention relates to organic polymers having a surface modified to improve the adhesive characteristics of such polymers.

It is well known in the art to surface treat organic polymers such as polyesters to improve the utility of such polymers. For example, it is known to treat polyester fibers to improve the adhesion of the polyester to substances such as rubber in the manufacture of tires. In U.S. Pat. No. 4,054,634, multifilament polyethylene terephthalate yarn is treated with a two-part finish, one part of which is applied after spinning and one part of which is applied after drawing. The first part contains a defined polyoxyethylated-polyoxypropylated monoether whereas the second part contains the monoether in combination with a defined epoxy ether silane and a sufficient amount of a water soluble alkaline catalyst to raise the pH to 8–10. Also see U.S. Pat. No. 4,348,517 wherein the same epoxy ether silane is combined with the triglycidyl ether of a glycerol and a defined diglycidyl ether and is used as a fiber finish for polyester yarn.

U.S. Pat. No. 3,793,425 also describes a process for improving the adhesion of polyester material to rubber. In the process, undrawn polyester yarn is coated with a composition containing an epoxy resin which is preferably buffered with an alkaline agent, such as sodium carbonate, lithium carbonate, potassium carbonate or ammonium hydroxide. The use of epoxy resins with alkaline catalysts to improve the adhesion of polyester to rubber is further disclosed in U.S. Pat. Nos. 3,423,230 and 3,464,878.

A process for treating chemically stabilized polyester material to improve the adhesion of the polyester to rubber is also described in U.S. Pat. No. 4,751,143. As noted therein, the aging period for chemically stabilized, adhesive activated polyester material can be reduced by contacting the material before it is substantially drawn or stretched with a composition containing a defined epoxide compound catalyzed with ions of at least one of potassium, cesium, or rubidium at a pH of between about 7.5 to about 13.0.

The application of finishes to the polymer surface generally produces a temporary surface condition such as lubrication or electrostatic charge dissipation which may be removed when the surface is subsequently exposed to multiple processing steps. Additionally, polyester surface modifications of the prior art employing epoxies to improve the adhesion of polyester to rubber for example, have resulted in the creation of toxic working conditions in the manufacture of such surface-modified polyester or in the production of articles which in subsequent processing or use would expose individuals to toxic conditions.

Other approaches employed in art to adjust the characteristics or properties of organic polymer surfaces include electrolytic and plasma treatments. However, these processes are costly and have limited processing rates. The application of a strong acid or base has not been particularly effective in modifying surfaces and can penetrate beyond the surface, particularly in fiber structures, to cause strength loss.

Polyisocyanates have been employed to enhance adhesion in the manufacture of polyester yarns (see U.S. Pat. No. 3,549,740). These materials have been applied at relatively high concentration levels (greater than 0.5 weight percent) and so generate obnoxious vapors, produce deposits on process rolls and bond filaments to filaments in the yarn bundle. Similar processing problems are encountered in the application of known polyester adhesives such as those based upon resorcinol-formaldehyde resins described in U.S. Pat. No. 3,660,202 and U.S. Pat. No. 3,318,750.

Molecular chains of aromatic groups connected by methylene groups attached to carbon atoms in the benzene rings have been employed to enhance adhesion of polyester articles (see British Patent Specifications 1,140,528 and 1,156,624). These products have been used as an RFL additive for adhesions and not as individual components. However, it has been found that for such products to be effective, 1.5% of the weight of the yarn is required. At this level, the yarns bond together making the processing very difficult.

Accordingly, it would be desirable to have the capability to permanently modify the organic polymer surface employing toxic process and improve the processing of the organic polymer in the production of articles of manufacture.

SUMMARY OF INVENTION

By the invention an organic polymer having a modified surface is obtained, the surface modification is a result of the reaction between a haloester compound having primary halogen substantially free of halohydrin and epoxy functionality and a coreactant comprising a cationic compound of an acid having a $pK_a > 5$, preferably reacted at an elevated temperature. As applied to polyester, polyetherimide, aromatic polyamide and graphitic polymers, the surface modification improves adhesion of such polymers to rubber and other elastomeric materials.

DETAILED DESCRIPTION OF THE INVENTION

The invention is useful in conjunction with organic polymers generally but has particular application to polyesters, aromatic polyamides, and graphitic polymers to improve the adhesive characteristics of such polymers. Other suitable organic polymers include nylons, polyketones, polyetherketones, polyethylenes, polyphenylene sulfides and polyvinyl alcohols.

The polyester employed in the present invention can be any polymeric linear ester which may be obtained by reacting one or more glycols of the series $HO(CH_2)_nOH$ wherein n ranges from 2 to 6 with one or more dicarboxylic acids such as naphthalene dicarboxylic acid, 4,4'-diphenyl dicarboxylic acid or, preferably, terephthalate acid. The polyester also may be prepared by alternate techniques such as polymerization of the monoester. The polyester can be a wholly aromatic polyester known to the art such as various combinations of p-hydroxybenzoic acid, 2,6-hydroxynaphthoic acid, 2,5-hydroxynaphthoic acid, 2,6-dihydroxynaphthalene, 2,6-naphthalenedicarboxylic acid, biphenol, bisphenol A, terephthalic acid, isophthalic acid and hydroquinone. Reference is made to U.S. Pat. No. 4,161,470, incorporated by reference, for a further description of such aromatic polyesters.

Additionally, the polyester may be reacted or blended with compatible compounds of polymers which do not substantially adversely affect the characteristics of the polyester. For example, compounds yielding non-ester linkages can be added into the reaction mixture for the polyester or formed polymers, pigments, fillers, antioxidants, etc. can be blended with the polyester. Preferably, polyester is polyethylene terephthalate which has an intrinsic viscosity (IV) of at least 0.35 and when employed in the production of tire yarn or other industrial elastomeric applications has a preferred IV of at least 0.7 deciliters per gram. IV is the intercept at zero concentration of the plot in RV/C vs C at 25° C. of polyester solutions in orthochlorophenol. RV is the relative viscosity and C is the concentration in grams per deciliter.

The graphitic polymers of this invention can be obtained by the carbonization/graphitization of pitch, rayon or acrylonitrile polymers such as described in U.S. Pat. No. 3,775,520 and U.S. Pat. No. 3,954,950, incorporated herein by reference thereto or by other methods known to the art. As described in the references the acrylonitrile polymer is preheated, passed through a preoxidation heating zone having an oxygen atmosphere and then passed through a carbonization/graphitization heating zone provided with an inert atmosphere. The invention is also applicable to aromatic polyamides such as poly-paraphenylene terephthalamide, polyparaphenylene/ 3,4'- diphenylether terephthalamide and polymetaphenylene isophthalamide.

The material into which the organic polymer is formed can be of any size and configuration amenable to surface modification processing. The material can therefore be film, sheets, rods, filaments and the like. As applied to filaments for example, the material can be in the form of yarns, cords and fabrics. As applied to filaments, the invention is particularly applicable to those filaments which have been melt spun and quenched.

The haloester organic compounds of the present invention are reactive, preferably having primary halogens, and with the ester functionality derived from primary alcohols. In particular, the haloester compounds include aliphatic halohydroxyesters wherein hydroxy functionality are secondary. The haloester compounds include those represented by the formula

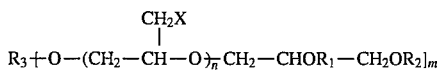

wherein $R_1$ may be H or $C_1$-$C_{22}$ organic acid ester residue; $R_2$ may be $C_1$-$C_{22}$ organic acid ester residue; n is 0–10; m is 1–4 and X is a halogen consisting of chlorine, bromine and iodine, there is at lease one X; $R_3$= organic residue of valence m.

The term "primary" means that the functionality is attached to a terminal aliphatic carbon. The term "secondary" means that the hydroxy functionality is attached to a nonterminal carbon contained in the aliphatic chain. The functionalities may be in the same or different molecules. Halogen is selected from the group consisting of chlorine, bromine and iodine and the haloester compound is substantially free of halohydrin and epoxy groups. As set forth in the parent application, the term substantially free is set forth as the halohydrin value of less than or equal to 1.7% and the epoxy value of less than or equal to 0.36%. As applied to the modification of the organic polymer surface for purposes of improved adhesion, the preferred haloester organic compound has at least one chlorine in at least one group selected from— $CH_2$ Cl group and a secondary hydroxyl. Such organic compounds can be represented in the following formulas:

1.

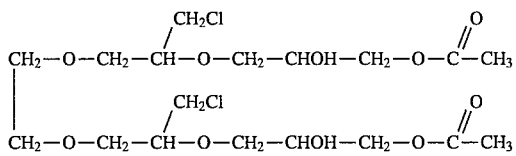

2.

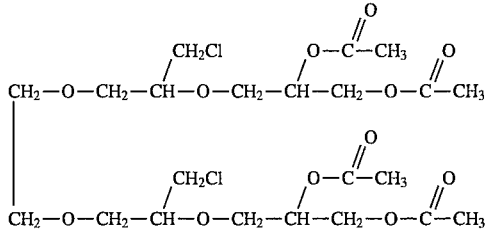

3.

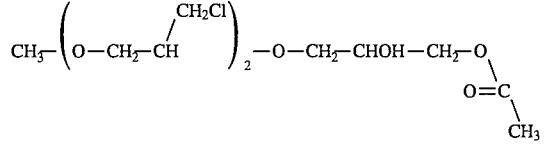

The coreactant can be any cationic compound of an acid having a $pK_a$> 5. Suitable coreactants include alkali metal, quaternary ammonium, quaternary phosphonium, and alkaline earth metal hydroxides, bicarbonates, carbonates, sulfites and oxides; also alkoxides, aryloxides, dimethylsulfoxide salts, acetamide salts, hydrocarbon salts, and hydrides. Preferred cationic compounds for improved adhesion are those selected from the group consisting of quaternary ammonium and alkali metal hydroxides, carbonates, and bicarbonates.

The haloester organic compound and the coreactant are applied to the organic polymer surface and preferably heated to a temperature of at least 100° C. whereon the reaction occurs to produce a modified polymer surface. The application can be made as an emulsion or as a solution with the haloester organic compound and the coreactant applied separately or together but preferably together.

Although not to be limited thereto, the invention will hereafter be described in a preferred embodiment. A polyester such as described in U.S. Pat. No. 4,414,169, incorporated by reference thereto, can be extruded as filaments and the filamentary material passed in the direction of its length through a solidification zone wherein the molten filamentary material uniformly is quenched and is transformed to a solid filamentary material.

In one aspect of the invention the haloester organic compound and the coreactant can be applied as an emulsion or solution to the filamentary material as it exits the solidification zone by known techniques such as via a kiss roll, spray, foam, metered applicator, etc. In addition to the haloester organic compound and the coreactant the emulsion may contain other conventional constituents such as emulsifiers, lubricants, biocides, tints, antifoams, antistatic agents, antioxidants, etc., present in known amounts in the emulsion. The polyester filaments following application will normally contain from 0.01 to 0.40 percent of the haloester organic compound and coreactant reaction product based on the weight of the filamentary material; preferably about 0.1 percent.

After the haloester organic compound and the coreactant are applied, the polyester filamentary material can be drawn or stretched to obtain a desired orientation. A total draw of from about 5.0:1.0 to about 6.5:1.0 in a low birefringence process and from about 1.5:1.0 to about 2.8:1.0 in a high birefringence (i.e., high stress) process is typically conducted in one or more drawing stages using known equipment such as pairs of skewed draw rolls.

The draw temperature is selected to yield the desired result. For example, in a high birefringence, two-stage draw process, the first stage can be conducted at a temperature below the glass transition temperature of the polyester (e.g., room temperature) as set forth in aforementioned U.S. Pat. No. 4,414,169. The second stage can also be conducted at a temperature below the glass transition temperature of the polyester (e.g. at room temperature).

After drawing, the polyester filamentary material can be subjected to a relaxing step of from about 0 to about 4% and/or heat setting at from about 190° to about 240° C.

In a second aspect of the invention the haloester organic compound and the coreactant can be applied as an emulsion or solution to the filamentary material after the drawing process employing yarn heating and the known techniques described above. Following application after drawing, the filaments will normally contain from 0.02 to 0.5 percent by weight of the aliphatic haloester organic compound and coreactant reaction product based on the weight of the filamentary material.

The surface-modified polyester produced by the process described above can be further processed to produce a material having utility in the production of tires and other articles of manufacture. Typically, in the production of such articles, a phenolic-aldehyde-latex composition is applied to the polyester yarn. The phenolic-aldehyde component (e.g. a resole) can be any condensation product of an aldehyde with a phenol which can be heat cured to form an infusible material. A typical phenolic-aidehyde-latex composition is a formulation containing resorcinol-formaldehyde resin and a rubber latex such as styrene-butadiene vinyl pyridine latex (e.g., an RFL composition). The preparation of such compositions is well known in the art.

The phenolic-aldehyde latex composition is generally applied in a quantity of from about 2 to about 10 weight percent (solids retention), based on the weight of the polyester material. Although not to be limited thereto, the phenolic-aldehyde-latex composition is preferably applied after the filament or yarn has been twisted into cord or woven into fabric. Preferably, the composition-coated material is subjected to a drying and curing treatment, both to eliminate the moisture in the coating and to complete the condensation of the phenolic-aldehyde component. The drying and curing operation is conveniently conducted in the presence of hot circulating air at a temperature of from about 120° to about 260° C.

The aliphatic haloester organic compound and the cationic compound can be admixed with other agents to achieve desirable results. For example, they can be used to replace the glycerol epoxide in a suspension of phenol blocked methylene-bis(4-phenylisocyanate) and applied to the polyester in cord form in the first step of a two stage process as described in U.S. Pat. No. 3,307,966. The RFL would be applied separately in a second stage.

The surface-modified polyester material onto which the RFL composition has been applied may then be used as reinforcing materials in the preparation of reinforced rubber-based materials such as pneumatic tires, conveyor belts, hoses, transmission belts, raincoats, and the like employing methods known to the art.

The following Examples are given as illustrations of the invention. It should be understood however, that the invention is not limited to the specific details set forth in the Examples.

EXAMPLE 1

A commercial 0.90 IV polyethylene terephthalate industrial yarn was twisted into a 1000/2 12×12 tpi cord, and the cord adhesive treated on a Laboratory Litzler Computreater using a two stage process. In the first stage, the cord was stretched 3% and then passed through a methanol/water solution containing 1.08 parts of a chloro-ether-ester described below, and 0.21 parts of potassium carbonate in 25 parts of water and 75 parts of methanol. The excess solution was blown off to achieve an application level of 0.2 dry weight percent on cord, and then exposed for thirty seconds at 400° F. In the second stage, the cord was relaxed 3% and a RFL adhesive described below was applied to the cord to achieve 3.5% weight percent solids pick up, and the cord was exposed to 450° F. temperature for fifty seconds.

The chloro-ether-ester used in the methanol/water solution consisted of a diether of PEG200 diol with nominally two oxychloropropylene units with two terminal 1-glycerol ethers that have been fully esterified with acetic acid.

Analysis of the chloro-ether-ester showed it to have a chlorine content of 10.23% and a low hydroxyl value of 21.6 mg KOH/g. 13C NMR showed only a trace of hydroxyl groups and no detectable chlorohydrins. The moisture content was 0.02%, epoxy value was 0.19% (as C2H30) and the sodium chloride content was 0.07%.

The composition of the RFL adhesive had the following ingredients:

| Ingredients | Parts by weight |
| --- | --- |
| water | 331 |
| NaOH (50% aqueous solution) | 2.6 |
| resorcinol | 16.6 |
| formaldehyde (37% aqueous solution) | 17.2 |
| terpolymer latex of styrene/ 1,3-butadiene/2-vinylpyridine 15/70/15 (41% latex) | 245 |

The above composition was prepared by adding the 2.6 parts of 50% NaOH to the water, followed by the 16.6 parts of resorcinol and 17.2 parts of formalin. This mixture was aged for one hour and stirred in to the 245 parts of the terpolymer latex. The resulting mixture was aged for 24 hours.

The treated cord prepared above was placed on a fabric backed rubber piece by winding on a rotating rubber drum. The cord was placed as tight as possible an end count. The fabric was cut into two 3"×3" squares and these squares were placed together, treated cord to treated cord, with a rubber layer 0.040 in. thick in between. The samples were then vulcanized at 320° F. for 13 minutes at 50 psi pressure, and the vulcanized samples were cut into three 1 in. strips.

One strip was placed in an environmental chamber at 220° F. for 30 minutes, and then the fabric plies were pulled apart at 220° F. on an Instron tensile tester at a rate of 6 in./minute. A second strip was tested under ambient (22° F.) conditions. The adhesion is characterized by the average force generated (pounds/inch) and by a visual rating. The visual rating is based upon a 1 to 5 scale where 1.0 is total falure at the fiber surface and 5.0 is cohesive failure in the rubber compound.

For purpose of comparison, the same cord was treated in exactly the same manner, except 0.290 parts of potassium acetate was used in the methanol/water solution rather than 0.20 parts of potassium carbonate. In each case this represents nominally two equivalents of potassium ion per mole weight of chloro-ether-ester.

The results of the adhesion testing are:

|  | 22° F. Peel Test | | 220° F. Peel Test | |
|---|---|---|---|---|
| Sample | Pull Force (lb/in) | Visual Rating | Pull Force (lb/in) | Visual Rating |
| CONTROL | 17.4 | 1.4 | 7.0 | 1.1 |
| PREFERRED | 35.5 | 2.7 | 24.1 | 2.8 |

EXAMPLE 2

Molten polyethylene terephthalate (PET) having an intrinsic viscosity of 0.928 deciliters/gram was spun at a temperature of 299° C. The product spun filaments were subjected to a two-stage drawing process with the first stage being conducted at ambient temperature and at a draw ratio of 1.2:1 and with the second stage being conducted with a steam jet between the draw rolls at 305°C. and a draw ratio of 1.6:1. The PET yarn was heat set at about 247° C. and then wound at a speed of 4760 meters per minute to obtain a slight relaxation. The yarn was of 1000 denier.

In this Example a blend was prepared containing 11.0 weight percent of a methyl ether containing nominally two oxychloropropylene units with terminal 1-glycerol ether that is monoesterified with an acetic acid residue, mostly in the remaining primary hydroxyl position, 1.80 weight percent of tetramethylammonium carbonate and 87.2 weight percent of a mixture comprising organomodified silicone, ethoxylated sorbitan mono-oleate, ethoxylated octylphenol and other minor ingredients.

Analysis of the chloro-ether-ester showed it to have a hydroxyl value of 149 mg KOH/gram, a total chlorine content of 24.46%, an epoxy value of 0.18% (as C2H3O), an acid value of 0.25 mg KOH/g, a moisture content of 0.06% and a sodium chloride content of 0.20%. A 13C NMR spectrum indicated that most of the ester acetate was attached to the primary position of the glycerol ether unit, and showed no detectable chlorohydrins.

The blend of surface-modifying chemicals as a 5% emulsion in deionized water was metered onto the filaments as they exited the solidification zone and prior to drawing. The dry weight concentration of finish on the yarn after wind-up as determined by extraction with methanol was 0.40% which is representative of a reaction product concentration of 0.05%.

Cords were prepared from the drawn yarns, and then treated using a dip pick-up of 6.5% target with a resorcinol-formaldehyde-latex (RFL) composition typically used in the tire industry.

After coating with the RFL, the coated cord was subjected to a conventional curing using a Litzler Computreater at standard conditions for tire cord. The treated cord was then tested for adhesion as described in Example 1. Adhesion results are shown below.

| Adhesion at 22° C. | | Adhesion at 105° C. | |
|---|---|---|---|
| lbs/in | visual rating | lbs/in | visual rating |
| 34.5 | 2.2 | 23.7 | 2.1 |

While the invention has been herein described in what is presently conceived to be preferred and exemplary embodiments thereof, those in the art may recognize that many modifications may be made thereof, which modifications shall be accorded the broadest scope of the appended claims so as to encompass all equivalent methods and products.

That which is claimed is:

1. A process which comprises contacting an organic polymer surface with a haloester organic compound having a primary halogen substantially free of halohydrin and epoxy functionality, and a cationic compound of an acid having a $pK_a > 5$ wherein the haloester organic compound is represented by the formula

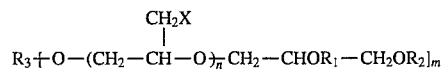

wherein $R_1$ is H or a $C_1$-$C_{22}$ organic acid ester residue; $R_2$ is a $C_1$-$C_{22}$ organic acid ester residue; X is a halogen selected from the group consisting of chlorine, bromine and iodine, there is at least one X; n is 0–10 and m is 1–4 and $R_3$ is an organic residue of valence m, wherein said solid organic polymer is selected from the group consisting of polyesters, aromatic polyamides and graphitic polymers.

2. The process of claim 1 wherein the temperature of said organic polymer surface is heated to at least 100° C. after application of a haloester organic compound and of a cationic compound.

3. The process of claim 2 wherein said polymer is in fiber form.

4. The process of claim 3 wherein said polymer is a polyester and said application occurs as the fibers exit the solidification zone of a fiber spinning process.

5. The process of claim 3 wherein said polymer is a polyester and wherein said application occurs after the fibers are drawn.

6. A process which comprises contacting a surface of an organic polymer polymer selected from the group consisting of polyesters, aromatic polyamides and graphitic polymers with a chloroester wherein the chloroester organic compound is represented by the formula

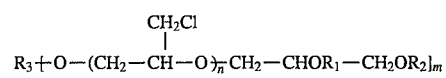

wherein $R_1$ is H or a $C_1$-$C_{22}$ organic acid ester residue; $R_2$ is a $C_1$-$C_{22}$ organic acid ester residue; n is 0–10 and m is 1–4 and $R_3$ is an organic residue of valence m.

7. The process of claim 6 wherein said cationic compound is selected from the group consisting of quaternary ammonium and alkali metal hydroxides, carbonates and bicarbonates.

8. The process of claim 7 wherein said polymer is in fiber form.

9. The process of claim 7 where said cationic compound is selected from the group consisting of potassium carbonate, potassium bicarbonate, tetramethylammonium carbonate and tetramethylammonium bicarbonate.

* * * * *